(12) United States Patent
Prosser

(10) Patent No.: US 8,591,164 B2
(45) Date of Patent: Nov. 26, 2013

(54) COMBINATION LADDER RACK AND LOADING DEVICE FOR USE WITH A PICKUP TRUCK AND A METHOD FOR ITS USE

(76) Inventor: James Prosser, Spring City, PA (US)

( * ) Notice: Subject to any disclaimer, the term of this patent is extended or adjusted under 35 U.S.C. 154(b) by 30 days.

(21) Appl. No.: 13/154,494

(22) Filed: Jun. 7, 2011

(65) Prior Publication Data
US 2012/0315115 A1 Dec. 13, 2012

(51) Int. Cl.
*B60P 1/54* (2006.01)

(52) U.S. Cl.
USPC ................. 414/541; 414/539; 414/546

(58) Field of Classification Search
CPC .......... B60P 1/54; B60P 1/483; B60P 1/5428; B60P 1/5476; B60P 1/549
USPC .......................... 414/539, 541, 546
IPC .......................................... B60P 1/54
See application file for complete search history.

(56) References Cited

U.S. PATENT DOCUMENTS

| | | | | |
|---|---|---|---|---|
| 1,378,631 A | * | 5/1921 | Stone | 414/473 |
| 1,464,131 A | * | 8/1923 | Goodger | 414/542 |
| 2,486,316 A | * | 10/1949 | Morse et al. | 414/462 |
| 2,492,841 A | * | 12/1949 | Burkey | 414/462 |
| 2,582,111 A | * | 1/1952 | Eakin | 212/260 |
| 2,911,118 A | * | 11/1959 | Tapp | 414/549 |
| 2,941,678 A | * | 6/1960 | Keys | 414/546 |
| 2,982,431 A | * | 5/1961 | Moody | 414/462 |
| 3,276,610 A | * | 10/1966 | Thatcher | 414/541 |
| 3,836,029 A | * | 9/1974 | Ruedebusch | 414/462 |
| 3,896,956 A | | 7/1975 | Hostetler | |
| 3,905,499 A | * | 9/1975 | Speidel | 414/462 |
| 4,023,690 A | | 5/1977 | Goode | |
| 4,084,708 A | | 4/1978 | Goodvin | |
| 4,128,179 A | | 12/1978 | Gilbert | |
| 4,239,438 A | * | 12/1980 | Everson | 414/462 |
| 4,265,585 A | * | 5/1981 | Hawkins | 414/541 |
| 4,269,561 A | * | 5/1981 | Rutten | 414/462 |
| 4,383,791 A | * | 5/1983 | King | 414/542 |
| 4,979,865 A | | 12/1990 | Strickland | |
| 5,108,251 A | * | 4/1992 | Lougheed et al. | 414/546 |
| 5,211,526 A | * | 5/1993 | Robinette | 414/550 |
| 5,297,912 A | * | 3/1994 | Levi | 414/462 |
| 5,586,856 A | * | 12/1996 | Springer | 414/462 |
| 5,609,462 A | * | 3/1997 | Reimer | 414/462 |
| 5,662,449 A | | 9/1997 | Krinhop | |
| 5,743,702 A | | 4/1998 | Gunderson | |
| 5,752,799 A | * | 5/1998 | Carey et al. | 414/543 |
| 6,042,328 A | | 3/2000 | McVaugh | |
| 6,089,431 A | * | 7/2000 | Heyworth | 224/521 |
| 6,164,895 A | * | 12/2000 | Croswell | 414/462 |

(Continued)

*Primary Examiner* — Saul Rodriguez
*Assistant Examiner* — Brendan Tighe
(74) *Attorney, Agent, or Firm* — Muskin & Famer, LLC; Shawn R. Farmer; Jon H. Muskin

(57) ABSTRACT

The present combination ladder rack and loader device is designed for use with pickup trucks. This device can function as a typical ladder rack, but also has the ability to lift large and heavy objects both into and out of the truck's bed. In one embodiment, the combination ladder rack and loader device can connect to the pick-up truck primarily through a receiver hitch allowing it to be easily disconnected from the truck when desired. This device can also comprise either a mechanical or an electrical winch to assist in the loading and unloading of large or heavy objects.

20 Claims, 11 Drawing Sheets

(56) References Cited

U.S. PATENT DOCUMENTS

| | | | |
|---|---|---|---|
| 6,283,699 B1* | 9/2001 | Simpson | 414/546 |
| 6,315,181 B1* | 11/2001 | Bradley et al. | 224/310 |
| 6,435,806 B1* | 8/2002 | Rinderknecht | 414/546 |
| 6,478,528 B1* | 11/2002 | Asbury | 414/550 |
| 6,655,722 B2 | 12/2003 | Bareket | |
| 6,666,643 B1 | 12/2003 | Heynssens | |
| 6,688,837 B2 | 2/2004 | Rinderknecht | |
| 6,799,935 B1* | 10/2004 | Grollitsch | 414/546 |
| 6,821,075 B2* | 11/2004 | van der Horn | 414/462 |
| 7,300,239 B2 | 11/2007 | Benedikt | |
| 7,413,394 B2 | 8/2008 | Risser | |
| 7,604,450 B1 | 10/2009 | Calvery | |
| 7,992,732 B2* | 8/2011 | Demiany et al. | 212/180 |
| 8,191,743 B1* | 6/2012 | Bowden et al. | 224/402 |
| 2001/0014272 A1* | 8/2001 | Ochoa et al. | 414/462 |
| 2002/0168257 A1* | 11/2002 | Smith et al. | 414/462 |
| 2002/0176769 A1* | 11/2002 | Rinderknecht | 414/546 |
| 2008/0279668 A1* | 11/2008 | Alexander | 414/607 |
| 2009/0067968 A1 | 3/2009 | McVaugh | |
| 2009/0115238 A1* | 5/2009 | Lane | 298/22 C |

\* cited by examiner

COMBINATION LADDER RACK AND LOADING DEVICE FOR USE WITH A PICKUP TRUCK AND A METHOD FOR ITS USE

FIELD OF THE INVENTION

The present device is ladder rack for use with a pickup truck that also has the capacity to move large and heavy objects both into and out of the bed of the pickup truck.

BACKGROUND

Pickup trucks comprising both cabs for transporting people and open beds for transporting goods have existed for many decades. Often, racks are used in the beds of such pickup trucks to facilitate the transport of longer objects, such as pipes, lumber and ladders. These racks are often referred to as "ladder racks." One of the benefits of such racks is the ability to use the area above the truck's cab for storage, eliminating the need for longer objects to protrude from the truck's bed, which can create a safety hazard. Additionally, such racks can hold objects above the floor of the truck's bed leaving it free to store other items. Ladder racks are typically semi-permanent fixtures that are bolted to the truck and are not easily removed.

Pickup truck's are commonly used to carry large and heavy objects in their beds, which would not fit easily into other vehicles because a truck's bed is not constrained by a roof. However, the floor of a typical truck bed is located at a height above the rear axle of the truck, which is significantly above ground level. This makes loading large or heavy items into to the truck bed difficult, if not impossible without significant assistance.

Attempts have been made to provide devices to be installed in trucks that provide loading and unloading assistance. These devices can use swivel arms to swing the object over the side or back of the bed that are hydraulically driven by pistons attached to the vehicle chassis, or mechanically driven by a winch. See for example Rinderknecht U.S. Pat. No. 6,688,837. These arms comprising such inventions can rotate about the attachment point on the chassis and provide the lifting power necessary to lift objects into or out of the truck. Other devices are attached to the back of a truck's bed and work like small, hydraulically-driven elevators. See for example Zrostlik U.S. Pat. No. 4,787,809. However, neither of these existing lifting devices have the capacity to provide additional storage on the truck when not in use as loading device. In fact, most of the existing devices reduce the amount of storage space available in the truck bed. Furthermore, neither of these devices can be easily removed from the truck.

One existing device, Gunderson U.S. Pat. No. 5,743,702, does have the capacity to work as both a ladder rack and a loading device. However, this device relies upon a sliding rail system, whereas the present device uses an entirely different mechanism. The present device can be more stable than the Gunderson design and can accommodate tool boxes and other objects commonly found on trucks that may be interfered with by the Gunderson device.

What is needed is a lifting device having the capacity to both load and unload large and heavy objects into and out of a pickup truck's bed that is also capable of providing a ladder rack for additional storage space when not being used as a lifting device. Additionally, the device should be easy to either connect or disconnect from the truck as desired.

SUMMARY OF THE INVENTION

It is an aspect of the present device is to provide a lifting apparatus for loading and unloading objects into and out of a pickup truck's bed that is also capable of providing a rack for additional storage space when not being used to load or unload large or heavy objects. This device can also be easily removed from and attached to a pickup truck as desired.

The above aspect can be obtained by a combination rack and loader device comprising: a boom section comprising a first horizontal support member and a second horizontal support member, wherein at least one cross member is connected perpendicularly to both the first horizontal support member and the second horizontal support member; a first boom rest configured to receive the first horizontal support member and a second boom rest configured to receive the second horizontal support member; a first vertical support member connected perpendicularly to the first horizontal support member, and a second vertical support member connected perpendicularly to the second horizontal support member; an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket; a first actuator configured to pivot the first vertical support member about the first main pivot bracket; and a control unit to control the first actuator.

The above aspect can also be obtained by a combination rack and loader device comprising: a boom section comprising a first horizontal support member and a second horizontal support member, wherein at least one cross member is connected perpendicularly to both the first horizontal support member and the second horizontal support member; a first boom rest configured to receive the first horizontal support member and a second boom rest configured to receive the second horizontal support member; a first vertical support member connected perpendicularly to the first horizontal support member, and a second vertical support member connected perpendicularly to the second horizontal support member; a winch connected to the cross member, wherein the wench also comprises a cable; an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket; a first actuator configured to pivot the first vertical support member about the first main pivot bracket and a second actuator configured to pivot the second vertical support member about the second main pivot bracket; and a control unit to control the first actuator and the second actuator.

The above aspect can also be obtained by a method for loading and unloading objects into a pickup truck's bed, the method comprising providing a pickup truck connected to a combination rack and loader device comprising: a boom section comprising a first horizontal support member and a second horizontal support member, wherein at least one cross member is connected perpendicularly to both the first horizontal support member and the second horizontal support member; a first boom rest configured to receive the first horizontal support member and a second boom rest configured to receive the second horizontal support member; a first vertical support member connected perpendicularly to the first horizontal support member, and a second vertical support member connected perpendicularly to the second horizontal support member; a winch connected to the cross member, wherein the wench also comprises a cable; an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket; a first actuator configured to pivot the first vertical support member about the first main pivot bracket and a second actuator configured to pivot the second vertical support member about the second main pivot bracket; and a control unit to control the first actuator and the second actuator; and placing a back of the pickup truck bed near an object to be loaded; using the control unit to operate the first actuator and the second actuator thus moving the first vertical support member and second vertical support member backward until the combination rack and loader device into a fully back position relative to the pickup truck's bed; connecting the object to the winch using the cable and lifting the object to a height greater than the height of the pickup truck bed; using the control unit to operate the first actuator and the second actuator thus moving the first vertical support member and second vertical support member forward until the combination rack and loader device is in a fully down position relative to the pickup truck's bed, wherein the first boom rest receives the first horizontal support member and the second boom rest receives the second horizontal support member; using the winch to lower the object into the pickup truck bed; and reversing these steps to unload the object from the pickup truck's bed.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
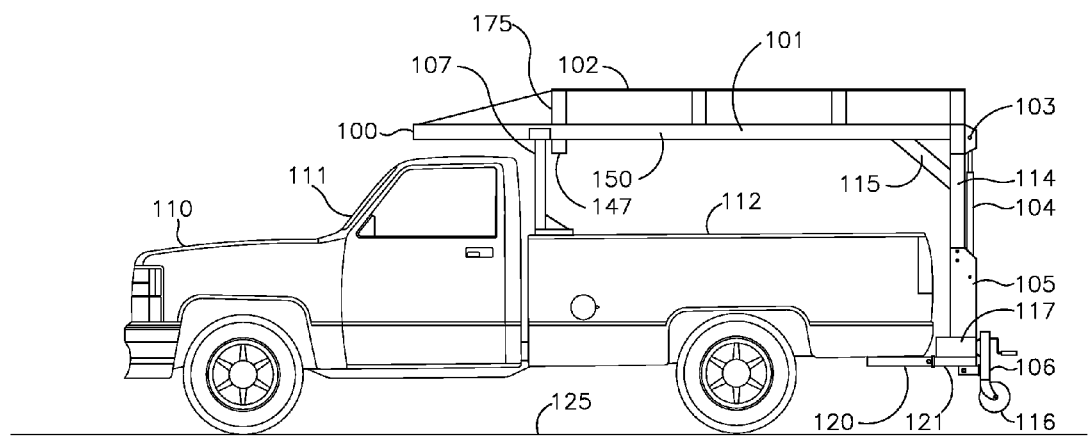
FIG. 1 is a side view of a pickup truck connected to a combination rack and loader device that is in a fully down position relative to the pickup truck's bed, according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

FIG. 1 is a side view of a pickup truck 110 connected a combination rack and loader device 100 that is in a fully down position relative to the pickup truck's bed 112, according to an embodiment.

A combination rack and loader device 100 can be connected to a pickup truck 110 through the use of a tow hitch receiver apparatus. Many pickup trucks comprise a tow hitch receiver apparatus further comprising a tow hitch receiver 120 capable of receiving and securely holding a square bar 121 that is only partially visible in FIG. 1, adapted to fit within the tow hitch receiver 120 and be secured in place with one or more pins or bolts (not pictured). This square bar 121 can be connected to a bumper 117 having a first end and a second end. The bumper 117 can comprise at least one main pivot bracket 105 connected perpendicularly to at least one end of the bumper 117. The bumper 117, main pivot brackets 105 and square bar 121 can comprise an attachment base configured to securely connect the combination rack and loader device 100 to a pickup truck 110.

The combination rack and loader device 100 can also comprise at least one vertical support member 114, which can be connected perpendicularly to a least one horizontal support member 101. In a preferred embodiment, a brace 115 can be used to reinforce the connection between each vertical support member 114 and each horizontal support member 101. Each vertical support member 114 can be pivotally attached to a main pivot bracket 105. Furthermore, an actuator 104 can be connected to both a vertical support member 114 at an upper connection bracket 103 and to a main pivot bracket 105. Each actuator 104 can be controlled by a control unit (not pictured) and allow each vertical support member 114 to pivot about a main pivot bracket 105. In a preferred embodiment, the actuator 104 can be a hydraulic cylinder, but screw jacks or any other suitable actuating device can also be used.

In one embodiment, one or more stabilizer jacks 106 can be connected to the bumper 117. These stabilizer jacks 106 can be used to support both the combination rack and loader device 100 and any object (not pictured) being moved into and out of the bed 112 of the pickup truck 110. Each stabilizer jack 106 can comprise a wheel 116 or base (not pictured) that can be lowered to contact the ground 125 before using the combination rack and loader device 100 to load or unload any objects.

The combination rack and loader device 100 can comprise a boom section 150, which resembles many typical ladder racks in terms of both appearance and function. Namely, it can comprise two or more horizontal support members 101, which can be located above and parallel to the bed 112 of a pickup truck 110. These horizontal support members 101 can typically be constructed from materials having a greater strength than those comprising commonly found ladder racks that do not have a loader functionality in order to support this loading function. The boom section 150 of the ladder rack can also comprise side racks 102 connected to the tops of each horizontal support member 101 by one or more side rack supports 175 to prevent ladders, pipes or any other objects from rolling or sliding off the ladder rack.

Each horizontal support member 101 can comprise a square receiver bracket 147 located near the front of the boom section 150. The boom section 150 can be supported by one or more boom rests 107 located near the cab 111 of the pickup truck 110. In one embodiment, the combination rack and loader device 100 can comprise two boom rests 107, wherein one is securely attached to each side of the front of the truck bed 112.

Figure 2:
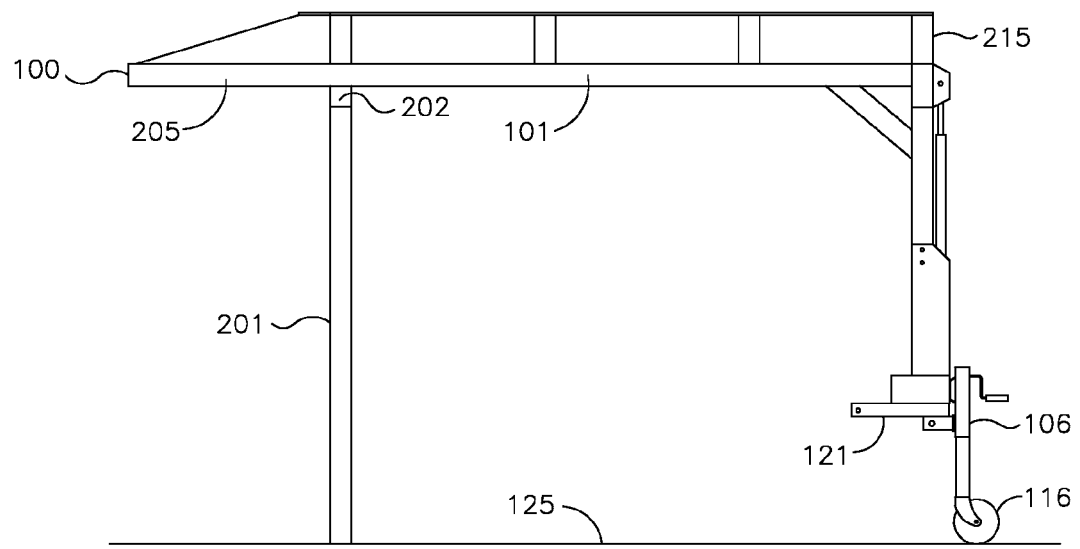
FIG. 2 is a side view of a combination rack and loader device that is not connected to a pickup truck, according to an embodiment.

FIG. 2 is a side view of a combination rack and loader device 100 that is not connected to a pickup truck, according to an embodiment.

It is an aspect of the present combination rack and loader device 100 that it can be easily disconnected from a pickup truck (not pictured), when not in use. To facilitate the device's 100 removal, attachment and storage, one or more supports 201 can be used to hold up a forward section 205 of the device 100 by connecting perpendicularly to two or more horizontal support members 101 by sliding through a square receiver bracket 147. Each support 201 can be L-shaped to allow clearance for the side of a truck (not pictured) as it moves under the combination rack and loader device 100.

The rear section 215 of the combination rack and loader device 100 can be supported by one or more stabilizer jacks 106 by lowering the wheels 116 or bases (not pictured) comprising each to contact the ground 125. This adjustment capability can be used to level the device 100 relative to the ground 125 and can be used to raise or lower the square bar 121 so as to align it with the truck's receiver hitch (not pictured). In one embodiment, the combination rack and loader device 100 should be in a fully down position, as pictured, in order to maximize its stability while being either removed or attached to a pickup truck and while being stored.

Figure 3:
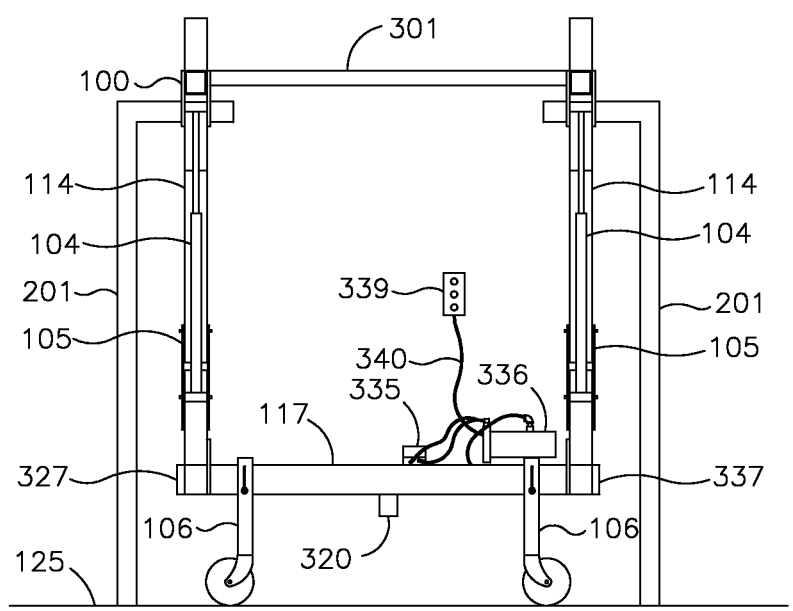
FIG. 3 is a rear view of a combination rack and loader device that is not connected to a pickup truck, according to an embodiment.

FIG. 3 is a rear view of a combination rack and loader device 100 that is not connected to a pickup truck, according to an embodiment.

This view clearly depicts the bumper 117 having a first end 327 and a second end 337, main pivot brackets 105, stabilizer jacks 106, and vertical support members 114. This view also depicts at least one crossbar 301, which is not visible in the side views. Such crossbars 301 provide both lateral support for the combination rack and loader device 100 and a place to attach a chain, rope, cable or similar suitable connecting device (not pictured) for attaching the loader 100 to an object (not pictured) to be moved by the loader 100.

Also, plainly viewable in this view are hydraulic cylinders 104, which can be used to actuate the combination rack and loader device 100. These hydraulic cylinders 104 can be powered by one or more hydraulic pumps 336, which can further comprise at least one electrical motor. Each hydraulic pump 336 can be controlled by a control unit 339 attached to the pump by a wire 340. In an alternative embodiment, the control unit 339 can operate the hydraulic pump 336 wirelessly. A hydraulic switch 335 can be used to control the flow of hydraulic fluid. Although the actuators shown in this figure are hydraulic cylinders 104, any other suitable actuator can be used to operate the combination rack and loader device 100.

In one embodiment, the combination rack and loader device 100 can comprise a supplemental tow hitch receiver 320 that can be used to replace the trucks tow hitch receiver, which is being utilized to connect the device 100 to the pickup truck (not pictured).

Figure 4:
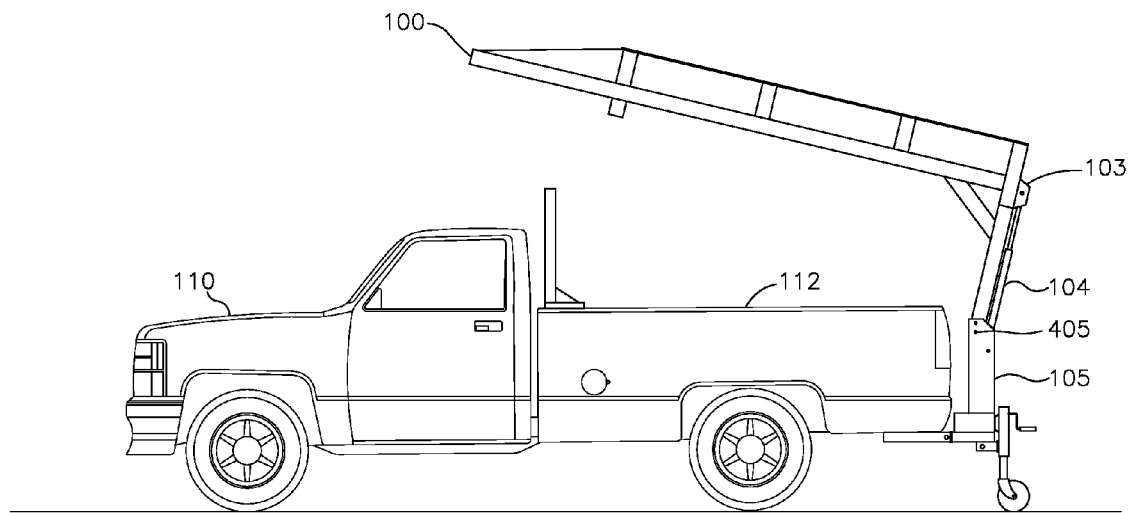
FIG. 4 is a side view of a pickup truck connected to a combination rack and loader device that is in a slightly raised position relative to the pickup truck's bed, according to an embodiment.

FIG. 4 is a side view of a pickup truck 110 connected to a combination rack and loader device 100 in a slightly raised position relative to the pickup truck's bed 112, according to an embodiment.

This view clearly depicts the pivot point where a vertical support member 114 can be connected to a main pivot bracket 105 by a pin 405 or similar connecting device that allows for a pivoting connection. This view also indicates how a hydraulic cylinder 104 can be used to actuate the rotational movement of a first vertical support member 114 about a first main pivot bracket 105 by pulling together or pushing apart the upper connection bracket 103 of the first vertical support member 114 and its connection at the first main pivot bracket 105.

Figure 5A:
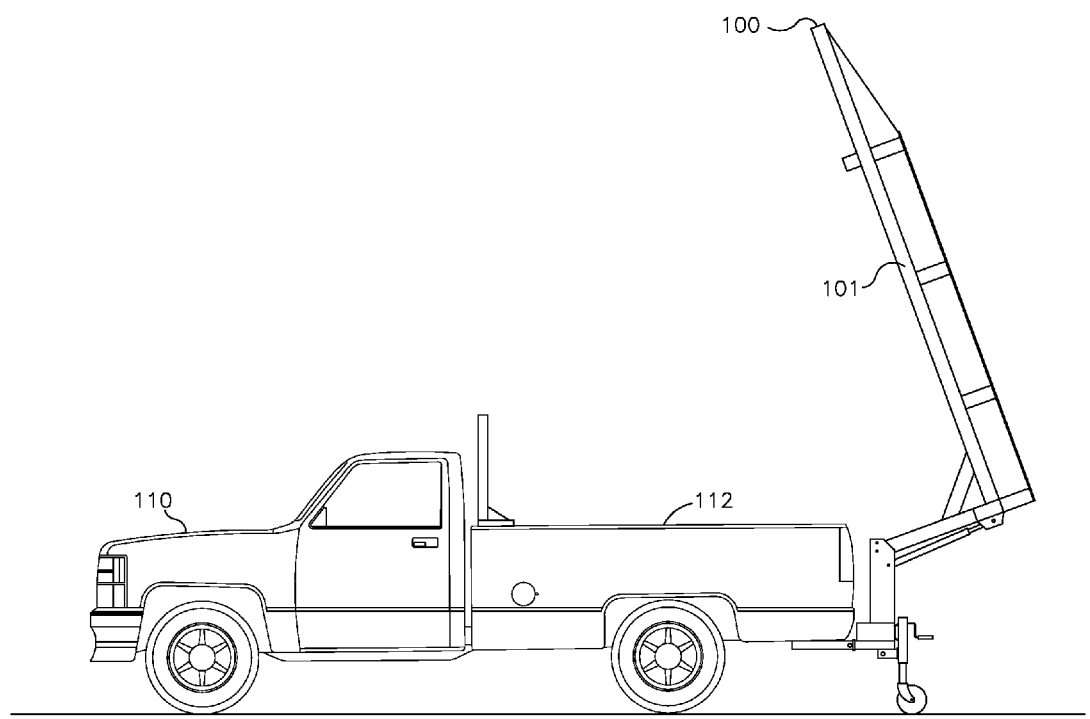
FIG. 5A is a side view of a pickup truck connected to a combination rack and loader device that is in a nearly vertical position relative to the pickup truck's bed, according to an embodiment.

FIG. 5A is a side view of a pickup truck 110 connected to a combination rack and loader device 100 in a nearly vertical position relative to the pickup truck's bed 112, according to an embodiment.

In a preferred embodiment, the horizontal support members 101 can have a range of motion greater than one hundred twenty degrees (120°), which can facilitate both the loading and unloading of heavy objects (not pictured) into and out of the bed 112 of the pickup 110. In an alternative embodiment, the range of motion can be greater than or less than one hundred twenty degrees (120°).

Figure 5B:
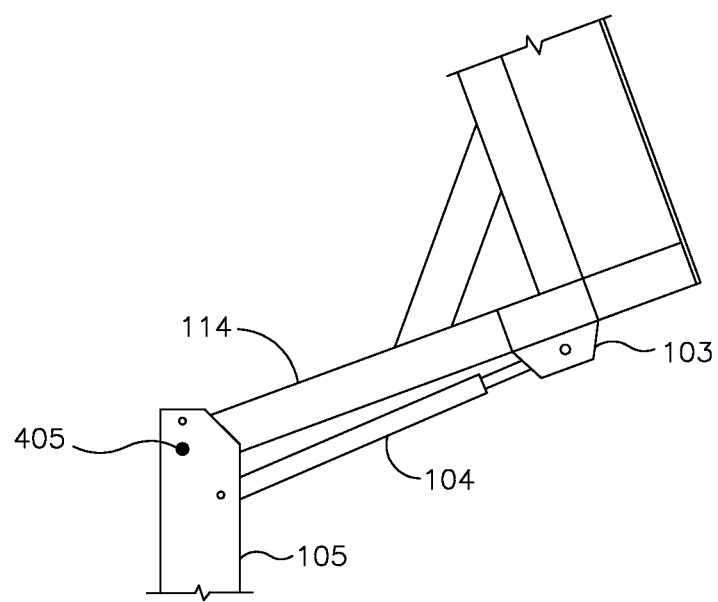
FIG. 5B is a close-up side view of a pivotable connection, as shown in FIG. 5A, comprising a combination rack and loader device that is in a nearly vertical position relative to the pickup truck's bed, according to an embodiment.

FIG. 5B is a close-up side view of a pivotable connection, as shown in FIG. 5A, comprising a combination rack and loader device 100 that is in a nearly vertical position relative to the pickup truck's bed (not pictured), according to an embodiment.

In this view the first hydraulic cylinder 104 can be used to actuate the rotational movement of a first vertical support member 114 about a first main pivot bracket 105 by pulling together the upper connection bracket 103 and the first main pivot bracket 105 and causing the first vertical support member 114 to rotate about the pin 405.

Figure 6:
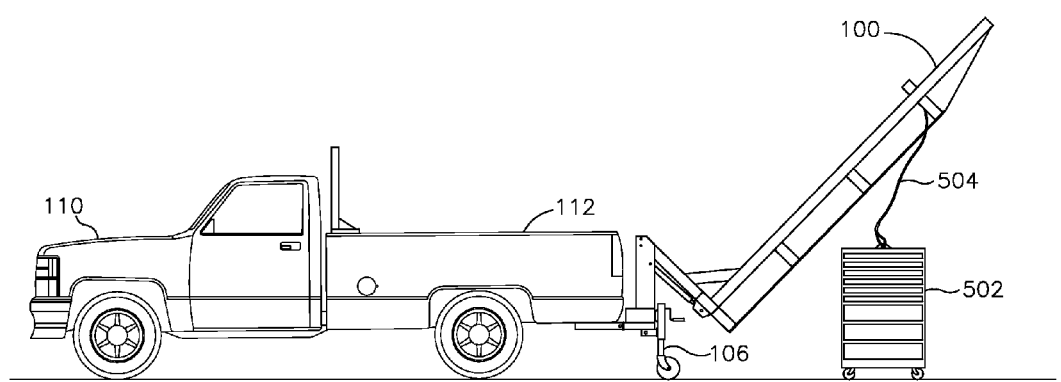
FIG. 6 is a side view of a pickup truck connected to a combination rack and loader device that is in a fully back position relative to the pickup truck's bed wherein the loader device is connected to a large and heavy object by a cable, according to an embodiment.

FIG. 6 is a side view of a pickup truck 110 connected to a combination rack and loader device 100 in a fully back position relative to the pickup truck's bed 112 wherein the loader device 100 is connected to a large and heavy object 502 by a cable 504, according to an embodiment.

The cable 504 can be connected to a winch (not pictured) that can be attached to at least one cross bar (not pictured). In a preferred embodiment, the winch can be actuated by an electric motor, but it can also be driven by a hand crank or any other similar mechanical system which is sufficient to lift large or heavy objects 502. This view also shows the use of at least one stabilizer jack 106, which can be necessary to support both the weight of the combination rack and loader device 100 and the large and heavy object 502 being either loaded or unloaded from the truck's bed 112.

Figures 7A, 7B:
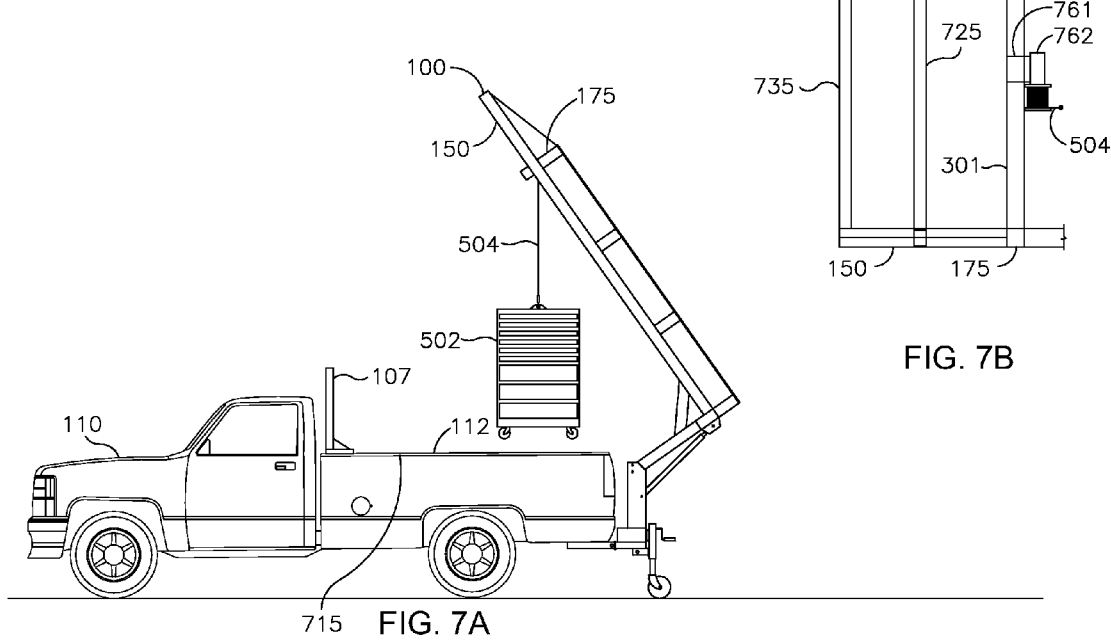
FIG. 7A is a side view of a pickup truck connected to a combination rack and loader device that is in a slightly forward of vertical position relative to the pickup truck's bed, wherein the loader device is connected to a large and heavy object by a cable, according to an embodiment.
FIG. 7B is a close-up top view of the front of a boom section of a combination rack and loader device as pictured in FIG. 7A, according to an embodiment.

FIG. 7A is a side view of a pickup truck 110 connected to a combination rack and loader device 100 in a slightly forward of vertical position relative to the pickup truck's bed 112, wherein the loader device 100 is connected to a large and heavy object 502 by a cable 504, according to an embodiment.

Although the pickup truck 110 in this view is a standard pickup, the combination rack and loader device 100 can also be used with a flat-bed truck (not pictured). The only compensating change required would be the lengthening of the boom rests 107 an amount required to maintain the horizontal support members 101 parallel to the truck bed 112 when the device 100 is in the fully down position. Additionally, many trucks comprise tool boxes (not pictured) mounted to the sides of the bed 715 and the embodiment depicted in FIG. 7 would not interfere with the use of such tool boxes.

FIG. 7B is a close-up top view of the front of a boom section 150 of a combination rack and loader device 100 as pictured in FIG. 7A, according to an embodiment.

Several features are viewable in this figure, which are not viewable in the other figures. Namely, the combination rack and loader device 100 can comprise a winch 762, further comprising a cable 504, which can be connected to a cross member 301 by a connecting bracket 761. In one embodiment, the winch 762 can be connected to the cross member 301 by a chain or strap (not pictured). In one embodiment, the cross member can be aligned with the forward most side rack supports 175.

The combination rack and loader device 100 can also comprise a forward cross member 735 and a movable cross member 725. This movable cross member 725 can be connected at various places along the horizontal support members 101 in order to ladders, pipes, boards, or other long materials to be carried by the combination rack and loader device 100.

Figure 8:
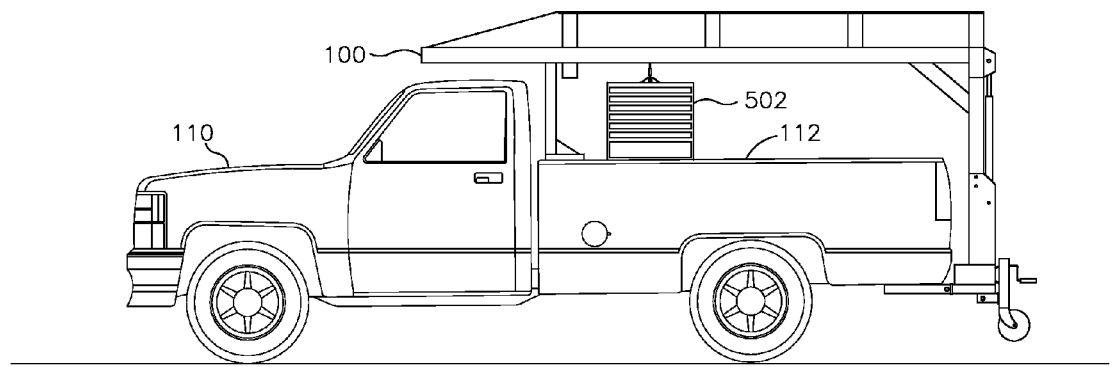
FIG. 8 is a side view of a pickup truck connected to a combination rack and loader device that is in a fully down position relative to the pickup truck's bed, wherein a large and heavy object has been placed within the truck's bed, according to an embodiment.

FIG. 8 is a side view of a pickup truck 110 connected to a combination rack and loader device 100 in a fully down position relative to the pickup truck's bed 112, wherein a large and heavy object 502 has been placed within the truck's bed 112, according to an embodiment.

Figure 9:
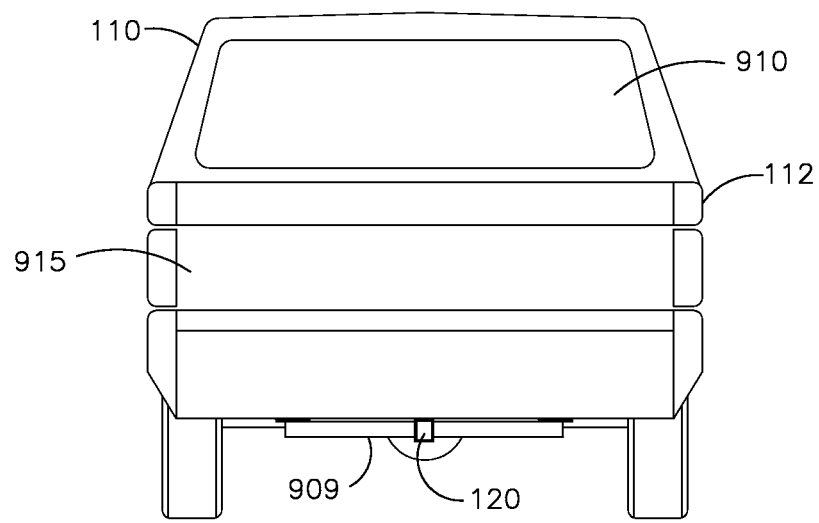
FIG. 9 is a rear view of a pickup truck comprising a receiver hitch.

FIG. 9 is a rear view of a pickup truck 110.

This view depicts the truck's 110 receiver hitch 909, bed 112, tailgate 915 and rear window 910. In a preferred embodiment, the combination rack and loader device 100 (not pictured) does not interfere with the operation of the tailgate 915.

Figure 10:
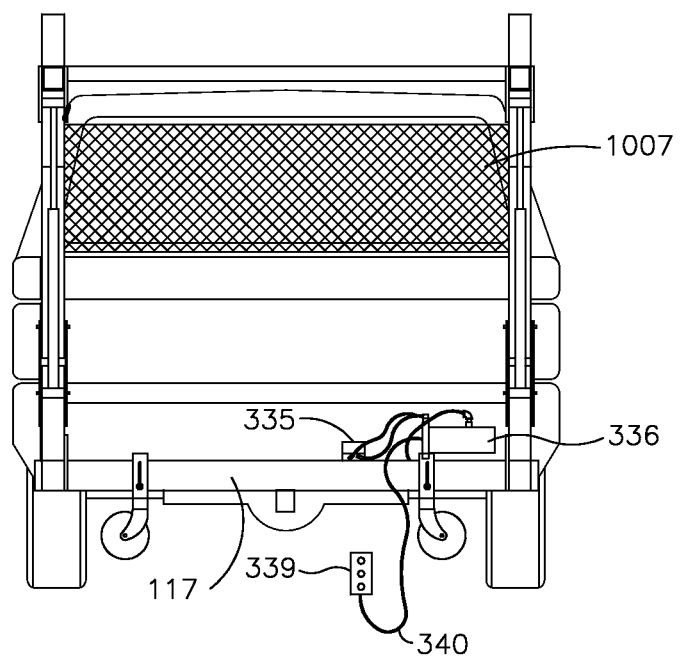
FIG. 10 is a rear view of a pickup truck connected to a combination rack and loader device, according to an embodiment.

FIG. 10 is a rear view of a pickup truck 110 connected to a combination rack and loader device 100, according to an embodiment.

Hydraulic cylinders 104, which are used to actuate the combination rack and loader device 100, are clearly visible in this view. In a preferred embodiment, two boom rests 107 can be connected by a window guard 1007, which can protect the rear window 910 of the pickup truck from potential impacts from large and heavy objects 502 being loaded into or out of the pickup truck's bed 112 or a variety of other potential hazards commonly encountered by such windows 910.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A combination rack and loader device comprising:
   a boom section comprising a first horizontal support member and a second horizontal support member, wherein at least one cross member is connected perpendicularly to both the first horizontal support member and the second horizontal support member, and at least one side rack support vertically extending from the first horizontal support member when the first horizontal support is resting in the horizontal position to function as a ladder rack;
   a first boom rest configured to receive the first horizontal support member and a second boom rest configured to receive the second horizontal support member;
   a first vertical support member connected perpendicularly to the first horizontal support member, and a second vertical support member connected perpendicularly to the second horizontal support member, wherein when the first horizontal support member and the second horizontal support member are in a horizontal position when supported by the first boom rest and the second boom rest;
   an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket;
   a first actuator configured to pivot the first vertical support member about the first main pivot bracket, wherein the first actuator is configured to rotate the first main pivot bracket more than ninety degrees; and
   a control unit to control the first actuator.

2. A combination rack and loader device as described in claim 1 further comprising a second actuator configured to pivot the second vertical support member about the second main pivot bracket, wherein the control unit can also control the second actuator.

3. A combination rack and loader device as described in claim 2 wherein the first main pivot bracket is connected to the first vertical support member using at least one pin, and the second main pivot bracket is connected to the second vertical support member using at least one pin.

4. A combination rack and loader device as described in claim 1 wherein at least one actuator is a hydraulic cylinder.

5. A combination rack and loader device as described in claim 1 further comprising at least one stabilizer jack connected to the bumper.

6. A combination rack and loader device as described in claim 1 further comprising a least one support configured to bear the forward section of the combination rack and loader device when it is not connected to a pickup truck.

7. A combination rack and loader device comprising:
   a boom section comprising a first horizontal support member and a second horizontal support member, wherein at least one cross member is connected perpendicularly to both the first horizontal support member and the second horizontal support member, and at least one side rack support vertically extending from the first horizontal support member when the first horizontal support is resting in the horizontal position to function as a ladder rack;

a first boom rest configured to receive the first horizontal support member and a second boom rest configured to receive the second horizontal support member;

a first vertical support member connected perpendicularly to the first horizontal support member, and a second vertical support member connected perpendicularly to the second horizontal support member, wherein when the first horizontal support member and the second horizontal support member are in a horizontal position when supported by the first boom rest and the second boom rest;

a winch connected to the cross member, and wherein the cross member is not located at an end of the first or second horizontal support members;

an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket;

a first actuator configured to pivot the first vertical support member about the first main pivot bracket and a second actuator configured to pivot the second vertical support member about the second main pivot bracket, wherein the first actuator is configured to rotate the first main pivot bracket more than ninety degrees and the second actuator is configured to rotate the second main pivot bracket more than ninety degrees; and a control unit to control the first actuator and the second actuator.

8. A combination rack and loader device as described in claim 7 wherein the winch is electrically driven.

9. A combination rack and loader device as described in claim 7 wherein the winch is mechanically driven.

10. A combination rack and loader device as described in claim 7 wherein at least one actuator is a hydraulic cylinder.

11. A combination rack and loader device as described in claim 7 wherein at least one actuator is an electric screw jack.

12. A combination rack and loader device as described in claim 7 further comprising at least one stabilizer jack connected to the bumper.

13. A combination rack and loader device as described in claim 7 wherein the bumper comprises a supplemental tow hitch receiver configured to be received by a tow hitch.

14. A method for loading and unloading objects into a pickup truck's bed, the method comprising:

providing a pickup truck connected to a combination rack and loader device comprising: a boom section comprising a first horizontal support member and a second horizontal support member, wherein at least one cross member is connected perpendicularly to both the first horizontal support member and the second horizontal support member, and at least one side rack support vertically extending from the first horizontal support member when the first horizontal support is resting in the horizontal position to function as a ladder rack;

a first boom rest configured to receive the first horizontal support member and a second boom rest configured to receive the second horizontal support member;

a first vertical support member connected perpendicularly to the first horizontal support member, and a second vertical support member connected perpendicularly to the second horizontal support member, wherein when the first horizontal support member and the second horizontal support member are in a horizontal position when supported by the first boom rest and the second boom rest;

a winch connected to the cross member, and wherein the cross member is not located at an end of the first or second horizontal support members;

an attachment base adapted to be removably connected to a tow hitch receiver, the attachment base comprising a bumper having a first end and a second end, the first end connected to a first main pivot bracket, and the second end connected to a second main pivot bracket, wherein the first vertical support member is pivotably connected to the first main pivot bracket and the second vertical support member is pivotably connected to the second main pivot bracket;

a first actuator configured to pivot the first vertical support member about the first main pivot bracket and a second actuator configured to pivot the second vertical support member about the second main pivot bracket, wherein the first actuator is configured to rotate the first main pivot bracket more than ninety degrees and the second actuator is configured to rotate that second main pivot bracket more than ninety degrees; and a control unit to control the first actuator and the second actuator; and placing a back of the pickup truck bed near an object to be loaded;

using the control unit to operate the first actuator and the second actuator thus moving the first vertical support member and second vertical support member backward until the combination rack and loader device into a fully back position relative to the pickup truck's bed;

connecting the object to the winch using the cable and lifting the object to a height greater than the height of the pickup truck bed;

using the control unit to operate the first actuator and the second actuator thus moving the first vertical support member and second vertical support member forward until the combination rack and loader device is in a fully down position relative to the pickup truck's bed, wherein the first boom rest receives the first horizontal support member and the second boom rest receives the second horizontal support member;

using the winch to lower the object into the pickup truck bed; and reversing these steps to unload the object from the pickup truck's bed.

15. A combination rack and loader device as described in claim 14 wherein the winch is electrically driven.

16. A combination rack and loader device as described in claim 14 wherein the winch is mechanically driven.

17. A combination rack and loader device as described in claim 14 wherein at least one actuator is a hydraulic cylinder.

18. A combination rack and loader device as described in claim 14 wherein at least one actuator is an electric screw jack.

19. A combination rack and loader device as described in claim 14 further comprising at least one stabilizer jack connected to the bumper, wherein the stabilizer jack is lowered to contact the ground before using the control unit to operate the first actuator and the second actuator thus moving the first vertical support member and second vertical support member.

20. A combination rack and loader device as described in claim 14 wherein the bumper comprises a receiver tube configured to be received by a tow hitch.

* * * * *